(12) United States Patent
Degen et al.

(10) Patent No.: US 8,872,703 B2
(45) Date of Patent: Oct. 28, 2014

(54) TRANSPARENT, FLAT ANTENNA, SUITABLE FOR TRANSMITTING AND RECEIVING ELECTROMAGNETIC WAVES, METHOD FOR THE PRODUCTION THEREOF, AND USE THEREOF

(75) Inventors: Christoph Degen, Aachen (DE); Gunther Vortmeier, Herzogenrath (DE); Stefan Droste, Herzogenrath (DE)

(73) Assignee: Saint-Gobain Glass France (FR)

( * ) Notice: Subject to any disclaimer, the term of this patent is extended or adjusted under 35 U.S.C. 154(b) by 579 days.

(21) Appl. No.: 13/127,880

(22) PCT Filed: Dec. 2, 2009

(86) PCT No.: PCT/EP2009/066237
§ 371 (c)(1),
(2), (4) Date: Jul. 28, 2011

(87) PCT Pub. No.: WO2010/081589
PCT Pub. Date: Jul. 22, 2010

(65) Prior Publication Data
US 2011/0279335 A1  Nov. 17, 2011

(30) Foreign Application Priority Data
Jan. 16, 2009  (DE) .................. 10 2009 004 927

(51) Int. Cl.
*H01Q 1/38*  (2006.01)
*H01Q 1/12*  (2006.01)
(52) U.S. Cl.
CPC .............. *H01Q 1/38* (2013.01); *H01Q 1/1271* (2013.01)
USPC .................................. 343/700 MS (58) Field of Classification Search
USPC .......................................... 343/700 MS, 705
See application file for complete search history.

(56) References Cited

U.S. PATENT DOCUMENTS

| | | | |
|---|---|---|---|
| 4,010,304 A | 3/1977 | Cohen | |
| 4,385,226 A | 5/1983 | Sauer | |
| 4,565,719 A | 1/1986 | Phillips et al. | |
| 4,655,811 A | 4/1987 | Bitter | |
| 4,725,710 A | 2/1988 | Ramus et al. | |
| 4,985,312 A | 1/1991 | Furuya et al. | |
| 5,111,329 A | 5/1992 | Gajewski et al. | |
| 5,324,374 A | 6/1994 | Harmand et al. | |
| 5,935,702 A | 8/1999 | Macquart et al. | |
| 6,045,896 A | 4/2000 | Boire et al. | |
| 7,223,940 B2 | 5/2007 | Voeltzel et al. | |

(Continued)

FOREIGN PATENT DOCUMENTS

| | | |
|---|---|---|
| DE | 1983228 | 4/1968 |
| DE | 10319606 | 11/2004 |

(Continued)

OTHER PUBLICATIONS

PCT Written Opinion issued for PCT Application No. PCT/EP2009/066237 filed on Dec. 2, 2009, in the name of Saint-Gobain Glass France (German + English).

(Continued)

*Primary Examiner* — Seung Lee
(74) *Attorney, Agent, or Firm* — Steinfl & Bruno LLP (57) ABSTRACT

A transparent, flat antenna for transmitting and receiving electromagnetic waves is described. The transparent, flat antenna comprises a transparent, electrically insulating substrate with a transparent, electrically conductive coating. Methods to produce such a transparent, flat antenna are also described.

16 Claims, 7 Drawing Sheets

(56) References Cited

U.S. PATENT DOCUMENTS

| | | |
|---|---|---|
| 7,388,548 B2 | 6/2008 | Maeuser |
| 7,831,219 B2 | 11/2010 | Heuermann et al. |
| 2003/0112190 A1 | 6/2003 | Baliarda et al. |
| 2007/0029186 A1 | 2/2007 | Krasnov et al. |
| 2007/0040746 A1 | 2/2007 | Song et al. |

FOREIGN PATENT DOCUMENTS

| | | |
|---|---|---|
| DE | 69731268 | 9/2006 |
| DE | 102005042960 | 3/2007 |
| DE | 102005058875 | 6/2007 |
| EP | 0638528 | 2/1995 |
| EP | 0718250 | 6/1996 |
| EP | 0720249 | 7/1996 |
| EP | 0827212 | 3/1998 |
| EP | 0847965 | 6/1998 |
| EP | 0911906 | 4/1999 |
| EP | 1104030 | 5/2001 |
| EP | 1489680 | 12/2004 |
| EP | 0799949 | 10/2007 |
| EP | 1868261 | 12/2007 |
| WO | 00/72635 | 11/2000 |

OTHER PUBLICATIONS

PCT International Search Report for PCT/EP2009/066237 filed on Dec. 2, 2009 in the name of Saint-Gobain Glass France.

TRANSPARENT, FLAT ANTENNA, SUITABLE FOR TRANSMITTING AND RECEIVING ELECTROMAGNETIC WAVES, METHOD FOR THE PRODUCTION THEREOF, AND USE THEREOF

CROSS REFERENCE TO RELATED APPLICATIONS

The present application is the US national stage of International Application PCT/EP2009/066237 filed on Dec. 2, 2009, which, in turn, claims priority to German Patent Application 102009004927.4 filed on Jan. 16, 2009.

The present invention relates to a new, transparent, flat antenna, suitable for transmitting and receiving electromagnetic waves.

In addition, the present invention relates to a new method for production of a transparent flat antenna, suitable for transmitting and receiving electromagnetic waves.

And finally, the present invention relates to the use of the transparent, flat antenna produced according to the new method, as a transparent built-in part or as a separate part.

Laminated safety glass panes, in particular windshields, for motor vehicles, that include electrically conductive, transparent layers, and methods for their manufacture are known, for example, from the patent applications and printed patents U.S. Pat. No. 4,010,304, U.S. Pat. No. 4,385,226, U.S. Pat. No. 4,565,719, U.S. Pat. No. 4,655,811, U.S. Pat. No. 4,725,710, U.S. Pat. No. 4,985,312, U.S. Pat. No. 5,111,329, U.S. Pat. No. 5,324,374, EP 0 638 528 A1, EP 0 718 250 A2, DE 697 31 268 T2, WO 00/72635 A1, and U.S. Pat. No. 7,223,940 B2. The transparent, electrically conductive layers may be used for the overall heating of the laminated safety glass panes or as IR-radiation reflecting layers; preferably, they are located in the interior of the laminated safety glass panes.

In addition, it is known from the patent applications US 2003/0112190 A1, EP 0 720 249 A2, DE 198 32 28 A1, and DE 103 19 606 A1 to use laminated safety glass panes with these transparent, electrically conductive layers as flat antennas for receiving electromagnetic radiation, in particular radio signals. The signals received can be galvanically or capacitively decoupled.

The disadvantage of such an arrangement consists in that the transparent, electrically conductive layer extends nearly to the edge of the pane, which results in a strong electrical coupling, in high-frequency technology, between the transparent, electrically conductive layer and the generally electrically conductive vehicle body. This coupling has a significant negative impact on the antenna function of the pane. This disadvantage can be at least partially remedied by removing the transparent, electrically conductive layer in the edge region of the pane circumferentially in a width of several centimeters. However, a several centimeter wide circumferential edge coating removal results in an optically unacceptable transition between the coated and the uncoated surface in the field of vision of the pane. This problem is serious, in particular with the use of abrasive coating removal methods. Furthermore, through edge coating removal, advantageous from the standpoint of antenna technology, with a width of to up to 50 mm or, in rare cases, even more, the thermal comfort of the pane is negatively affected permanently.

There is also the fact that this wide circumferential edge coating removal can no longer be simply concealed by ceramic printing with a circumferential opaque edge strip as is the case with the customarily used circumferential edge coating removal with a width of 10 mm or less. Moreover, the field of vision of the driver of the motor vehicle is greatly restricted by a wide, circumferential, opaque edge strip, a circumstance that must be avoided for safety reasons.

The object of the present invention was to provide new, transparent, flat antennas for transmitting and receiving electromagnetic waves with a transparent, electrically conductive coating, which no longer have the disadvantages of the prior art, but which can be produced in a simple manner and have excellent antenna performance as transparent, functional, and decorative separate parts or as transparent built-in parts in means of transportation for land, air, and water traffic as well as in furniture, equipment, and buildings. In the case of the transparent built-in parts, the excellent antenna performance should not be negatively impacted even with an electrically insulating, circumferential edge coating removal of a width of 10 mm and less by a strong electrical coupling in high-frequency technology. It should be possible to conceal the electrically insulating, circumferential edge coating removal without any problems with a circumferential edge strip such that the field of vision of individuals looking through, such as, for example, the drivers of motor vehicles no longer has to be greatly restricted but can remain large for safety reasons.

In addition, the object of the invention was to provide a suitable new method for production of the aforementioned transparent, flat antennas for transmitting and receiving electromagnetic waves, which no longer has the disadvantages of the prior art, but which, in a simple and very readily reproducible manner, delivers transparent, flat antennas that have the aforementioned properties and advantages.

And finally, the object of the present invention was to reveal uses for the new transparent, flat antennas that are produced using the new method according to the invention.

Accordingly, the transparent, flat antenna (A) for transmitting and receiving electromagnetic waves was found, comprising
 at least one transparent, electrically insulating substrate (1) that has in its surface (1.1) an electrically insulating, circumferential edge region (1.1a),
 a transparent, electrically conductive coating (2) that
  covers large areas of the surface (1.1) of the substrate (1) up to the edge region (1.1a) and
  is formed by at least two flat segments (2.1n), where n=1 or a whole number n>1, that
   contain or are made of at least one electrically conductive material (2.2) and
   are insulated from each other by at least one linear, electrically insulating region (2.3) and
 at least one connection (3) for galvanic, capacitive, or inductive decoupling of the antenna signal from at least one flat segment (2.1n),
which is referred to in the following for the sake of brevity as "antenna according to the invention".

In addition, the new method for production of a transparent, flat antenna (A) for transmitting and receiving electromagnetic waves was found, wherein
(I) a transparent, pane-shaped laminate (A'), comprising
 at least one transparent, electrically insulating substrate (1) that has on its surface (1.1) an electrically insulating, circumferential edge region (1.1) and
 a non-segmented, transparent, electrically conductive coating (2) that covers large areas of the transparent, insulating substrate (1) up to the edge region (1.1) and contains or is made of at least one electrically conductive material (2.2),
is produced, (II) the non-segmented coating (2) is divided by at least one linear, electrically insulating region (2.3) into at least two flat, electrically conductive segments (2.1n), where n=1 or a whole number >1, and (III) at least one of the two segments (2.1n) or (2.1n+1) is furnished with a connection (3) for galvanic or capacitive decoupling of the antenna signal.

and which is referred to in the following for the sake of brevity as "method according to the invention".

And finally, the new use of the antenna according to the invention, produced using the method according to the invention as a transparent, functional, and, possibly, decorative separate part or as a transparent built-in part in means of transportation for land, air, and water traffic as well as in furniture, equipment, and buildings was found, which is referred to in the following for the sake of brevity as "use according to the invention".

With regard to the prior art, it was not directly inferable even for the person skilled in the art that the object of the present invention could be accomplished using the antenna according to the invention, the method according to the invention, and the use according to the invention.

In particular, with regard to the prior art, it was not inferable that the antennas according to the invention could be produced in a simple and reproducible manner with the method according to the invention, for the use according to the invention and could be used outstandingly as transparent, functional, and/or decorative separate parts and as transparent built-in parts in means of transportation for land, air, and water traffic as well as in furniture, equipment and buildings.

The antennas according to the invention are transparent to visible light. This means that they are permeable at least in individual regions, but preferably overall to electromagnetic radiation of a wavelength of 350 to 800 nm. "Transparent" means that the transmission, in particular for visible light is >50%, preferably >75%, and, in particular >80%.

The antennas according to the invention are flat. This means that with any given antenna according to the invention each of the primary surfaces (2.1n) has a very much larger area than the insulating edge region parallel to the circumferential edge of the substrate 1. Preferably, the ratio of the area of a primary surface to the area of the circumferential edge is >2, preferably, >5, and, in particular, >10, especially preferably, >50.

The antennas according to the invention can have different three-dimensional shapes. Thus, they can be planar or more or less sharply bent or curved in one or a plurality of spatial directions. In addition, they can have arbitrarily shaped outlines. The outlines can be symmetric or asymmetric. Preferably, they are exactly or approximately circular, elliptical, triangular, quadrilateral, trapezoidal, rhomboid, pentagonal, or hexagonal. In particular, they are approximately rectangular or trapezoidal. Here, the term "approximately" means, e.g., that in the case of an approximately quadrilateral outline, the corners are rounded and/or the edges can be curved inward and/or outward. Preferred are outlines, such as windowpanes have, especially preferably, windshields, side windows, rear windows, or glass roofs, in particular, of motor vehicles.

The size of the antenna according to the invention can vary broadly and is determined by the respective purpose for use in the context of the use according to the invention. Thus, the antennas according to the invention can have dimensions from a few centimeters to multiple meters. In particular, the antennas, planar or slightly or greatly curved or bent in one or a plurality of spatial directions, can have an area on the order of 100 cm$^2$ to 25 m$^2$, preferably, >1 m$^2$. The antennas according to the invention can, however, also have areas like windshields, side windows, rear windows, and glass roofs for motor vehicles or large-area panes, as used in the construction sector, commonly have.

The antennas according to the invention can have perforations. These can be used to accommodate devices for mounting, for connection to other objects, and/or the passage of conductors, in particular, electrical conductors.

The antennas according to the invention comprise in each case at least one transparent, electrically insulating substrate. Preferably, the substrate has high transmission for electromagnetic radiation of a wavelength of 350 to 800 nm, in particular, however, for visible light, preferably, transmission >50%, more preferably >75%, especially preferably, >85% and, very especially preferably, >95%.

Accordingly, all transparent, electrically insulating substrates that have such transmission, including the metallic coating, and are thermally and chemically stable as well as dimensionally stable under the conditions of the manufacture and use of the objects according to the invention are fundamentally suitable.

The transparent, electrically insulating substrates can have any three-dimensional shape that can be defined by the three-dimensional shapes of the antennas according to the invention that they include, in use as a functional and, possibly, decorative separate part. For use as a built-in part, the external outline of the substrate 1 is defined in most cases by the installation site, and the antenna according to the invention must be adapted appropriately, in particular with regard to its segments (2.1n). Preferably, the three-dimensional shape has no shadow zones such that they can be uniformly coated from the gasphase in particular. Preferably, the three-dimensional shapes described above are used.

The transparent, electrically insulating substrates can be colorless or colored.

Examples of suitable materials for production of transparent, electrically insulating substrates are glass and, preferably, rigid clear plastics, such as polystyrene, polyamide, polyester, polyvinyl chloride, polycarbonate, or polymethyl methacrylate, polyethylene terephtalate. The use of other transparent materials is, however, not ruled out.

Preferably, transparent, electrically insulating substrates made of glass are used. Basically, all common and known glasses, as are described, for example, in Römpp-Online 2008 under the keywords "Glas [glass]", "Hartglas [toughened glass]", or "Sicherheitsglas [safety glass]", or in the German translation of the European patent EP 0 847 965 B1 with file number DE 697 31 268 T2, page 8, par. [0053] come into consideration as substrate material. Examples of particularly well-suited glasses are non-prestressed, partially prestressed, and prestressed float glass, cast glass, and ceramic glass. Float glass is used in particular.

The thickness of the transparent, electrically insulating substrates can vary broadly and, thus, be eminently adapted to the requirements of the individual case. Preferably, glasses with standard glass thicknesses from 1 mm to 24 mm are used.

The transparent, electrically insulating substrates have, on one of the two surfaces, an electrically insulating, circumferential edge region.

Its electrically insulating action is based on the absence of electrically conductive material, i.e., the circumferential edge region is the uncoated or subsequently decoated region of the surface of the transparent, electrically insulating substrate.

The width of the electrically insulating, circumferential edge region can vary broadly and, thus, be eminently adapted to the requirements of the individual case. It is, however, a quite particular advantage of the antenna according to the invention that the circumferential edge region can be comparatively narrow. Preferably, its width is 0.2 to 1.5 cm, preferably, 0.3 to 1.3 cm, and, in particular, 0.4 to 1.0 cm.

The electrically insulating, circumferential edge region can be covered by a decorative coating.

The transparent, electrically insulating substrates have, on the surface with the electrically insulating, circumferential edge region, a transparent, electrically conductive coating.

In the following, "transparent" means that the electrically conductive coatings are permeable to electromagnetic radiation of a wavelength of 350 to 800 nm. "Permeable" means that the transmission, in particular, for visible light is >50%, preferably, >75%, and, in particular, >80%. Especially preferred are transparent coatings that are impermeable to IR-radiation, in other words, they reflect IR-radiation.

In the following, "electrically conductive" means that the transparent, electrically conductive coatings have a low electrical sheet resistance $R_\square$. Preferably, the electrical sheet resistance $R_\square$ Is from $0.5\Omega/\square$ to $15\Omega/\square$.

The transparent, electrically conductive coatings cover large areas of the surface of the transparent, electrically insulating substrate up to the electrically insulating edge region. Preferably, more than 50%, more preferably, more than 70%, especially preferably, more than 80%, and, in particular, more than 90% of the surface is covered with the coating.

The transparent, electrically conductive coatings include at least one electrically conductive material or are made therefrom.

Accordingly, a given transparent, electrically conductive coating can consist of one layer made of an electrically conductive material or of at least two layers made of two different, electrically conductive materials.

In addition, the transparent, electrically conductive coating can be constructed from at least one layer made of an electrically conductive material and at least one layer made of a transparent, dielectric material. For example, the transparent, electrically conductive coating can consist of a first layer made of a transparent, dielectric material, a layer made of an electrically conductive material and a second layer made of the same or a different transparent, dielectric material, stacked in the order indicated. In the general case, the entire, transparent layer structure can include multiple alternating different dielectric layers and electrically conductive layers.

Examples of suitable electrically conductive materials are metals with high electrical conductivity, such as silver, copper, gold, aluminum, or molybdenum, in particular, silver or silver alloyed with palladium, as well as transparent, electrically conductive oxides (transparent conductive oxides, TCO), as are, for example, described in the American patent application US 2007/029186 A1 on page 3, par. [0026], and page 4, par. [0034]. Preferably, the TCOs are indium tin oxide (ITO), fluorine-doped tin oxide (fluor tin oxide, FTO), zinc oxide doped with aluminum (aluminum zinc oxide, AZO), gallium-doped zinc oxide, boron-doped zinc oxide, tin zinc oxide, or antimony-doped tin dioxide (antimony tin oxide, ATO).

The thickness of the transparent, electrically conductive coatings can vary broadly and, thus, be eminently adapted to the requirements of the individual case. It is essential that the thickness of the transparent, electrically conductive coatings not be so high that the layer structure as a whole according to the above definition loses its transparency. The maximum thicknesses are directly related to the electrical total sheet resistance of the layer structure.

Preferably, the thickness of a given transparent, electrically conductive coating is 30 nm to 100 µm at each point, except in the linear, electrically insulating regions described in the following.

If the transparent, electrically conductive coating is made of a TCO, its thickness is preferably 100 nm to 1.5 µm, more preferably, 150 nm to 1 µm, and, in particular, 200 nm to 500 nm.

If the transparent, electrically conductive coating is made of at least one transparent, dielectric layer and at least one layer of a metal, its thickness is preferably 20 nm to 100 µm, more preferably, 25 nm to 90 µm, and, in particular, 30 nm to 80 µm.

Examples of transparent coatings that are suitable for the production of the structured, transparent coatings used according to the invention, as well as methods for their production are known from the patent application and published patents U.S. Pat. No. 4,010,304, col. 1, line 67, to col. 5, line 35,
U.S. Pat. No. 4,565,719, col. 2, line 3, to col. 18, line 51,
U.S. Pat. No. 4,655,811, col. 3, line 56, to col. 13, line 63,
U.S. Pat. No. 4,985,312, col. 1, line 64, to col. 7, line 25,
U.S. Pat. No. 5,111,329, col. 3, line 32, to col. 12,
U.S. Pat. No. 5,324,374, col. 2, line 38, to col. 6, line 37,
EP 0 638 528 A1, page 2, line 19, to page 10, line 57,
EP 0 718 250 A2, page 2, line 42, to page 13, line 44,
DE 697 31 268 T2, page 3, par. [0011], to page 7, par. [0051], page 8, par. [0060], to page 13, par. [0091],
WO 00/72635 A1, page 3, line 16 to 35, and
U.S. Pat. No. 7,223,940 B2, col. 5, line 8, to col. 6, line 38.

In addition, the transparent, electrically conductive coating can be present on transparent carrier films, preferably transparent plastic films, on the basis of polyamide, polyurethane, polyvinyl chloride, polycarbonate, polyester, and polyvinyl butyral, especially preferably, polyester films, and, in particular, polyethylene terephthalate films.

The transparent, electrically conductive coatings are formed in each case by at least two flat segments that are isolated from each other by at least one linear, electrically insulating region. "Linear" means that a given region has a width that is very much smaller than its length.

The areas, the outlines, and the positions of the flat segments can vary quite broadly from case to case and are determined, in particular, by the size of the antennas according to the invention, i.e., by the area that is available in the individual case for the transparent, electrically conductive coatings. In addition, they are determined by the wavelength of the electromagnetic radiation that is to be received or transmitted. The size of a flat segment can, for example, be adapted such that it is suitable for receiving USW [ultrashort wave=VHF] (30 to 300 MHz, corresponding to a free space wavelength of 10 to 1 m), shortwave (3 to 30 MHz, corresponding to a free space wavelength of 100 to 10 m) or medium wave (300 to 3000 kHz, corresponding to a free space wavelength of 1000 to 100 m). Moreover, two flat segments can be dimensioned in one antenna according to the invention such that they can be used for different services; thus, for example, one of the flat segments can serve as an antenna for radio reception in the VHF range and the other, for example, as an antenna for Band-III television reception.

A large number of design possibilities to realize this with an antenna according to the invention are available to the person skilled in the art. Thus, a linear, electrically insulating region can surround, circumferentially closed, at least one flat segment. However, a linear, electrically insulating region can also surround, circumferentially open, a flat segment such that the two ends of the region are guided to the electrically insulating, circumferential edge region. However, there can also be noncontiguous, linear, electrically insulating regions, parallel and at different distances from the edge region, that extend from one edge region to the opposite edge region. With the latter embodiment mentioned, the possibility exists that at least one of the flat segments can be used to heat the antenna according to the invention. But, there can also be, within a flat segment that is surrounded, circumferentially open or closed, by a linear, electrically insulating region, a separate, straight, linear, electrically insulating region, which has a length corresponding to roughly half the wavelength of the radio service to be received, such that a slot antenna results.

A further embodiment results if there is, parallel to a first linear, electrically insulating, circumferentially closed region, preferably parallel thereto, a second or even more additional linear, electrically insulating, circumferentially closed regions, wherein the linear, electrically insulating, circumferentially closed regions surround, circumferentially closed, at least one central, flat, electrically conductive segment.

Between the linear, electrically insulating, circumferentially closed regions, electrically conducting, circumferentially closed segments then result, which can, additionally, be divided by linear electrically insulating regions.

Preferably, the linear, electrically insulating regions are formed by regions that are free of electrically conductive material. Their width can vary from case to case and thus be eminently adapted to the requirements of the individual case. Preferably, the width is from 10 to 200 μm, more preferably, 25 to 175 μm, and, in particular, 50 to 150 μm. Generally, regions of this width can no longer be optically perceived by an observer. Their depth can also vary and thus be eminently adapted to the requirements of the individual case. Preferably, their depth reaches from the surface of the transparent, electrically conductive coating to the surface of the transparent, electrically insulating substrate.

At least one of the above described flat segments has a connection for galvanic, capacitive, or inductive decoupling of the antenna signal received. According to the invention, at least one antenna structure is used for transmitting and/or receiving.

In addition, at least one more galvanic, capacitive, or inductive connection can be present in another flat segment, which serves as an opposite pole or ground for the other connection or for decoupling another antenna signal. Inductive coupling is mentioned in DE 10 2005 042 960 A1.

Examples of suitable galvanic connections, with which a problem-free transition from the very transparent, electrically conductive coating to the usual dimensions of cables and plugs can be accomplished, are known from the American patent U.S. Pat. No. 7,223,940 B2, col. 1, line 55, to col. 2, line 43, and col. 6, line 48, to col. 9, line 59, in conjunction with FIGS. 1 to 9.

Examples of suitable capacitive connections or coupling elements are known from the German patent application DE 103 19 606 A1, par. [0010] to [0039], in conjunction with FIGS. 1 to 3, or the German patent application DE 198 32 228 A1, col. 1, line 56, to col. 4, line 41, in conjunction with FIGS. 1 to 3.

Preferably, capacitive connections or coupling elements are used.

The antenna signals decoupled using the above-described connections are forwarded via common and known electronic components, such as matching networks (cf., e.g., the German patent application DE 10 2005 058875 A1) and antenna amplifiers, to the receiver, such as, e.g., a radio, a television, a navigation device, a clock, a measuring instrument, an electronic display, or a computer.

Moreover, depending on their material composition, the transparent electrically conductive coatings of the antennas according to the invention fulfill other functions, such as, e.g., reflection or absorption of infrared radiation for purposes of thermoregulation or heat insulation or solar protection.

The antennas according to the invention can include further functional layers.

If, for example, their transparent, insulating substrates are made of glass, they can include, between the transparent, electrically conductive coatings and the surface of the substrate, transparent barrier layers to prevent the diffusion of ions, in particular, alkali metal ions. Suitable barrier layers are made, preferably, of dielectric materials, in particular, of nitrides, oxides, and oxide nitrides of silicon and/or aluminum. Preferably, they have a thickness of 30 to 300 nm.

In addition, they can include transparent, adhesive layers, between the transparent, electrically conductive coatings and surface of substrates. Preferably, these are also made of dielectric materials, in particular, of mixed oxides of zinc and tin. Preferably, they have a thickness of 3 to 100 nm.

If both a transparent barrier layer and a transparent adhesive layer are present, the transparent barrier layer is connected directly to the surface of the transparent, electrically insulating substrate.

Furthermore, the antennas according to the invention can also include color reflection films, UV or IR reflection films, tinting films, or heat protection films.

Moreover, the antennas according to the invention can in each case also include at least one, in particular, one, second transparent, electrically insulating substrate, that is preferably firmly bonded by at least one, in particular, one tear-resistant, adhesive layer to the first transparent, electrically insulating substrate, on which the transparent, electrically conductive coating is found. Here, "firmly bonded" means that the affected layers are permanently bonded to each other and cannot be separated from each other without seriously damaging or even destroying at least one of them.

In this embodiment, the transparent, electrically conductive coating can be on the surface of the first transparent, electrically insulating substrate, which is turned away from the transparent, tear-resistant, adhesive layer. Preferably, however, the transparent, electrically conductive coating is on the surface of the first transparent, electrically insulating substrate, which is facing the transparent, tear-resistant, adhesive layer. In this preferred embodiment, the transparent, electrically conductive coating, including the coating on a carrier film, is embedded in the transparent, tear-resistant, adhesive layer.

The above-described substrates can be used as a second transparent, electrically insulating substrate. In a given antenna according to the invention, the two substrates can be the same or different from each other; preferably, they are the same.

In the tensile test, the transparent, tear-resistant, adhesive layers demonstrate a high elongation at tear or elongation at break. Preferably, the elongation at tear is >50%.

"Adhesive" means that the affected layers have a high interlayer adhesion, that is preferably high enough that the bonded layers cannot be separated from each other without seriously damaging or even destroying them.

The thickness of the transparent, tear-resistant, adhesive layers can vary broadly and, consequently, be eminently adapted to the requirements of the individual case. Preferably, the layers are 0.1 to 10 mm, more preferably, 0.2 to 5 mm, especially preferably, 0.3 to 1 mm thick.

As materials for the production of the transparent, tear-resistant, adhesive layers, basically, all materials that have the above-described necessary profile of properties come into consideration. Preferably, the material is selected from among the group consisting of casting resins cured thermally and/or with actinic radiation and tear-resistant adhesive films.

As is known, thermally cured casting resins are made from thermally curable casting resins that include complementary reactive functional groups that react with each other under the action of thermal energy such that a three-dimensional network is formed in the cured casting resin. Examples of suitable thermally curable casting resins are epoxy resins as are, for example, described in Römpp Online 2008 under the keyword "Epoxidharze [epoxy resins]".

As is known, cured casting resins are produced with actinic radiation from casting resins that include reactive functional groups that polymerize anionically, cationically, or radically, in particular, radically, under the action of actinic radiation. In particular, the reactive functional groups are olefinically unsaturated double bonds. Examples of suitable casting resins curable with actinic radiation are known from Römpp Online 2008, "Strahlenhärtende Systeme [radiation curing systems]" and "Strahlenhärtung [radiation curing]". As actinic radiation, electromagnetic radiation, such as near infrared (NIR), visible light, UV radiation, x-ray radiation, and gamma radiation, or corpuscular radiation, such as electron radiation, proton radiation, beta radiation, or alpha radiation, come into consideration.

The casting resins can contain common and known adhesive, as described, for example, in the European patent application EP 0 799 949 A1, col. 6, lines 24 to 32.

Preferably, the tear-resistant adhesive films are selected from the group consisting of polyvinyl butyral, PVB, poly (ethylene vinylacetate), EVA, polyethylene terephthalate, PET, polyvinyl chloride, PVC, ionomer resins based on ethylene and/or propylene and alpha, beta-unsaturated carboxylic acids or polyurethane, PU. In particular, polyurethane films are used.

Preferably, in above-described embodiment of the antennas according to the invention, the second transparent, electrically insulating substrates and the transparent, tear-resistant, adhesive layers have substantially or exactly the same dimensions as the first transparent, electrically insulating substrates such that they can be bonded to each other with a precise fit. This also applies to the embodiments in which the antennas according to the invention are bent in at least one spatial direction.

The antennas according to the invention and be produced in extremely different ways.

For example, a mask that corresponds to the desired structure of the linear, insulating regions as well as the electrically insulating, circumferential edge regions, which are to remain free of electrically conductive material, can be applied on the transparent, electrically insulating substrate. Then, at least one electrically conductive material can be deposited from the gas phase onto the substrate, whereby the method described in the following can be used. The above-described segmented, transparent, electrically conductive develops directly. Then, the mask is removed, and the segmented, transparent, electrically conductive coating is provided with at least one of the above-described galvanic or inductive capacitive connections.

According to the invention, it is, however, advantageous to produce the antennas according to the invention using the method according to the invention. On the other hand, the method according to the invention can also be used for production of transparent objects other than the antennas according to the invention. However, the method according to the invention reveals its special advantages, in particular, in the production of the antennas according to the invention.

Before the execution of the first step of the method, the transparent, electrically insulating substrate can be thermally treated, cleaned, in particular, degreased, and/or polished. Then, at least one of the above-described barrier layers and/or adhesive layers can be applied, whereby the method described in the following for deposition of thin layers from the gas phase can be used.

In the first step of the method according to the invention, a laminate (A') that comprises at least one, in particular one, electrically insulating substrate that has, on one of its surfaces, a circumferential, electrically insulating edge region, and a nonsegmented, electrically conductive coating that covers large areas of the substrate up to the edge region and contains or is made of at least one electrically conductive material. Preferably, the laminate (A') is exactly planar.

For this, at least one electrically conductive material is applied to large areas of one surface of the transparent, electrically conductive substrate or to the surface of a layer located thereon such that a nonsegmented, transparent, electrically conductive coating results, that contains or is made of the electrically conductive material. A mask that covers the edge region of the surface of the substrate can be applied such that the electrically insulating, circumferential edge region results directly. Preferably, the total surface of the substrate is coated. Especially preferably, an exactly planar substrate is used.

For the coating or application, known methods and devices can be used, such as deposition from the gas phase, application from the liquid phase, or lamination of plastic films that are coated with electrically conductive materials.

Preferably, the nonsegmented, transparent, electrically conductive coating is deposited from the gas phase, whereby common and known methods can be used, such as chemical glass phase deposition (CVD [chemical vapor deposition]) or physical glass phase deposition (PVD [physical vapor deposition]) as well as the corresponding devices suitable for this. Examples of CVD methods are spray pyrolysis, chemical vapor deposition, and sol-gel deposition. Examples of PVD methods are electron beam vapor deposition and vacuum sputtering.

Preferably, sputtering methods are used.

Sputtering is a common and known method for the manufacture of thin layers of materials that cannot be readily vaporized. In it, the surface of a solid body of suitable composition, the so-called target, is atomized by bombardment with high-energy ions from low-pressure plasmas, such as oxygen ions ($O^+$) and/or argon ions ($Ar^+$), or neutral particles, after which the atomized materials are deposited on substrates in the form of thin layers (cf. Römpp Online, 2008, "Sputtering"). Preferably, high-frequency sputtering, known as HF-sputtering, or magnetic field assisted sputtering, known as magnetron sputtering (MSVD), is used.

Suitable sputtering methods are described, for example, in the American patents U.S. Pat. No. 7,223,940 B2, col. 6, lines 25 through 38, and U.S. Pat. No. 4,985,312, col. 4, page 18, through col. 7, line 10, or in the German translation of the European patent EP 0 847 965 B1 with the file number DE 697 31 268 T2, page 8, par. [0060], and page 9, par. [0070], through page 10, par. [0072].

In the second step of the method according to the invention, the nonsegmented, electrically conductive, transparent coating is divided into at least two flat, electrically conductive segments, by removing the electrically conductive material in the desired places. Optionally, the electrically insulating, circumferential edge region can also be produced in this manner.

The electrically conductive material can be removed mechanically, thermally, and/or by irradiation with electromagnetic radiation or corpuscular radiation, preferably with electromagnetic radiation.

One advantageous method for mechanical removal of the electrically conductive material for production of the linear, electrically insulating regions that works very precisely and delivers particularly fine regions is ultrasound hammering.

One advantageous method for removal of the electrically conductive material for production of the linear, electrically insulating regions by thermal action and/or by irradiation with electromagnetic radiation, that likewise works very precisely and delivers particularly fine regions is irradiation with a focused laser beam, as is described, for example, in the European patent applications EP 0 827 212 A2 and EP 1 104 030 A2. Preferably, a neodymium:YAG laser of a wavelength of the emitted light of 523 nm is used.

For production of the electrically insulating, circumferential edge region, the electrically conductive material is preferably abraded by mechanical methods such as grinding.

Then, in the third step of the method according to the invention, at least one of the resulting flat segments is furnished with a connection for the subsequent galvanic or capacitive decoupling of the antenna signal, such that the antenna according to the invention results.

Before the execution of the third step of the method, the transparent, electrically insulating substrate coated with the segmented, transparent, electrically conductive coating, can be reshaped at high temperatures, in particular, curved or bent in one spatial direction. For this, a thermal treatment of the type bending/prestressing or cooling in the lehr can be used.

The height of the temperatures is determined by the materials from which the respective transparent, electrically insulating substrates and/or the transparent, electrically conductive coatings are made. If they contain or are made of plastic, the temperature must not be set high enough that the material melts and/or is thermally damaged. Preferably, in these cases, the temperature is above the glass transition temperature of the plastics and below 200° C. In the case of substrates made of glass, the temperature is between 500 and 700° C., in particular 550 and 650° C.

Before or after the execution of the third step of the method or before or after the reshaping, the electrically insulating, circumferential edge region and/or the galvanic or capacitive connections can be provided, e.g., by ceramic printing with a decorative coating, to optically conceal the transition from the edge region to the transparent, electrically conductive coating and/or the connections.

The antennas according to the invention, in particular the antennas according to the invention produced using the method according to the invention, can be used in many ways.

With particular advantage, they are used in the context of use according to the invention as transparent built-in parts in means of transportation for land, air, and water traffic, preferably in motor vehicles, such as automobiles, trucks, and trains, in aircraft and in ships as well as in furniture, equipment, and buildings. In particular, they are built in in motor vehicles in the form of windshields, side windows, rear windows, and glass roofs.

In addition, they can be used with particular advantage as transparent, functional, and/or decorative separate parts, such as, for example, freestanding, transparent, decorative separate parts that, optionally, have additional decorative elements.

In the following, the antenna according to the invention is explained by way of example with reference to FIGS. 1 to 14. FIGS. 1 to 14 are schematic depictions intended to illustrate the principle of the invention. The schematic depictions do not, consequently, need to be true to scale. Consequently, the size relationships depicted do not have to correspond to the size relationships used in the exercise of the invention in practice.

In FIG. 1 through 14, the reference characters have the following meaning:
(A) antenna according to the invention,
(1) transparent, electrically insulating substrate,
(1.1) coated surface of the transparent, electrically insulating substrate,
(1.1a) electrically insulating, circumferential edge region,
(2) transparent, electrically conductive coating,
(2.11) flat segment (2.1n) where n=1,
(2.12) flat segment (2.1n) where n=2 or divided flat segment (2.1n) where n=2,
(2.13) flat segment (2.1n) where n=3 or divided flat segment (2.1n) where n=3,
(2.14) flat segment (2.1n) where n=4 or divided flat segment (2.1n) where n=4,
(2.15) flat segment (2.1n) where n=5
(2.2) electrically conductive material,
(2.3) linear, electrically insulating region,
(3) capacitive connection or galvanic connection for decoupling the antenna signal,
(3.1) capacitive connection or galvanic connection for decoupling a second antenna signal or as an opposite pole or ground for the capacitive connection (3),
(4) second transparent, electrically insulating substrate,
(5) transparent, tear-resistant, adhesive layer,
X-X cross-sectional line
Y-Y cross-sectional line
(6) PET film as a carrier substrate for the conductive coating.

(7) galvanic, inductive, or capacitive connection conductor

In the following, for the sake of brevity, the antennas according to the invention der FIGS. 1 to 14 are referred to as "antennas according to the invention 1 through 14".

The substrates (1) of the antennas according to the invention 1 through 14 as well as the substrate (4) of the antenna according to the invention 9, 12 through 14 are float glass panes of dimensions, as they are used, for example, for windshields, side windows, rear windows, or glass roofs in automobile construction, in small, medium, or large area panes in furniture, equipment, or buildings. The dimensions can be several square centimeters to several square meters.

The coatings (2) of the antennas according to the invention 1 through 14 are in each case a coating, as is described in the German translation of the European patent EP 0 847 965 B1 with the file number DE 697 31 2 168 T2, Example 1, page 9, par. [0063], to page 11, par. [0080]. This layer comprises two layers made of silver as an electrically conductive material (2.2).

The coatings (2) of the antennas according to the invention 1 through 14 cover the surface (1.1) of the substrate (1) up to the edge region (1.1a) of a width of 7.5 mm.

Linear, electrically insulating regions (2.3) are inscribed in the coatings (2) of the antennas according to the invention 1 through 14. They have a width of 100 µm and a depth that reaches from the surface of the coatings (2) to the surface (1.1).

The flat segments (2.1n), where n=1 or a whole number >1, are defined by the linear, electrically insulating regions (2.3). The highest number n indicates the number of the flat segments present in a coating (2) in each case. Thus, e.g., the reference character (2.13) refers to the fact that three flat segments (2.1n) are present.

Figure 1:
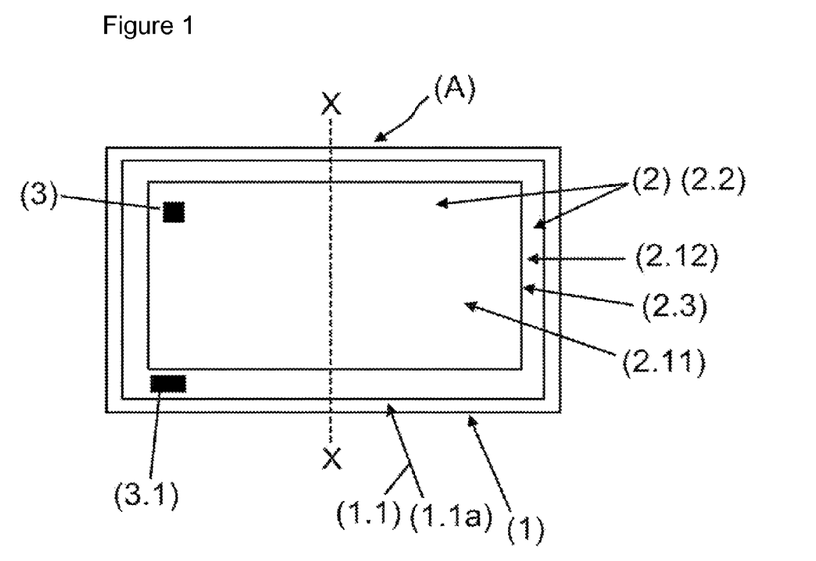
FIG. 1 depicts a first embodiment of the antenna according to the invention in top plan view.

The coating (2) of the antenna according to the invention 1 includes a linear, electrically insulating region, circumferentially closed, substantially parallel to the edge region (1.1a) such that two flat segments (2.11) and (2.12) result, whereby the flat segment (2.12) surrounds the flat segment (2.11) in a closed manner. The signal received by the segment (2.11) is decoupled via a common and known capacitive connection (3). The segment (2.12) can include another common and known capacitive connection (3.1) that serves as an opposite pole or ground for the connection (3).

Figure 2:
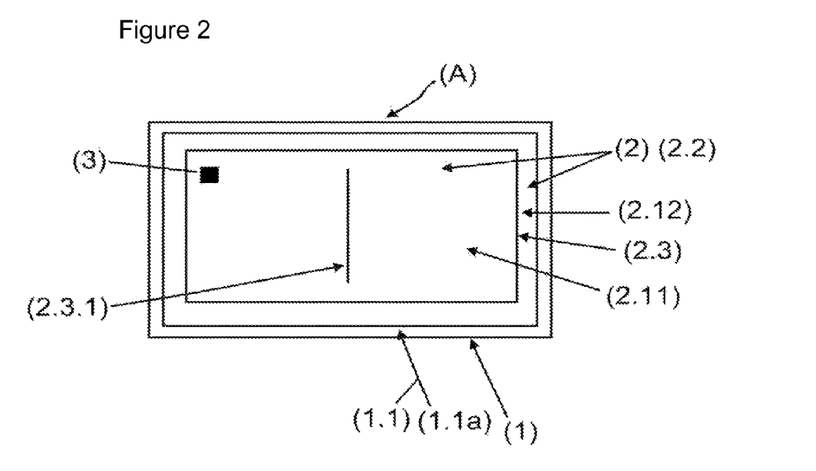
FIG. 2 depicts a second embodiment of the antenna according to the invention in top plan view.

The configuration of the antenna according to the invention 2 corresponds to that of the antenna according to the invention 1 with the difference that the segment (2.11) of the antenna according to the invention 2 additionally contains one more straight, linear, electrically insulating region (2.3.1), whose length corresponds roughly to the wavelength of the radio service to be received such that the segment (2.11) has the configuration of a slot antenna.

Figure 3:
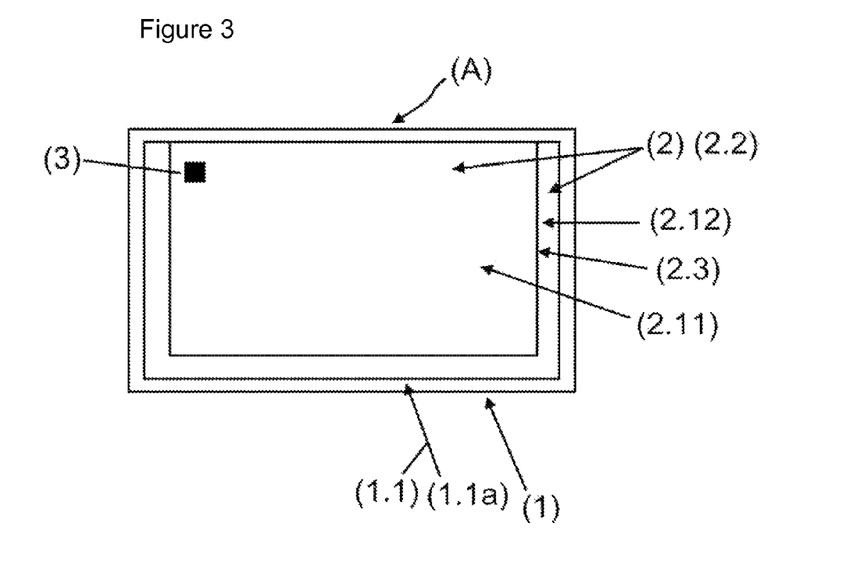
FIG. 3 depicts a third embodiment of the antenna according to the invention in top plan view.

The configuration of the antenna according to the invention 3 also corresponds to that of the antenna according to the invention 1 with the difference that region (2.3) surrounds the segment (2.11) in an open manner such that its two ends pass over into the edge region (1.1a).

Figure 4:
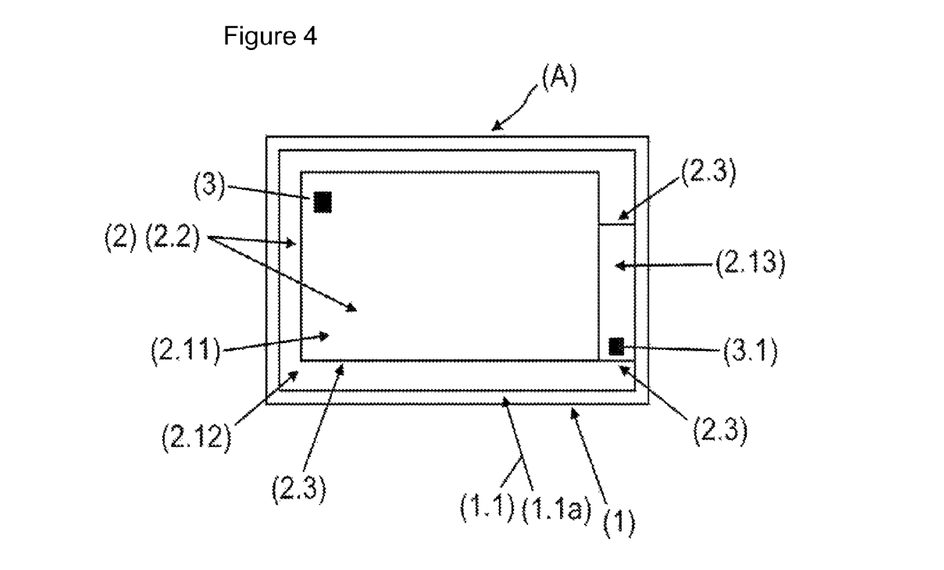
FIG. 4 depicts a fourth embodiment of the antenna according to the invention in top plan view.

The configuration of the antenna according to the invention 4 again corresponds to that of the antenna according to the invention 1 with the difference that the circumferential segment (2.12) is divided by two further regions (2.3) such that a third segment (2.13) results. Each of the segments (2.11) and (2.13) has a capacitive Connection (3) and (3.1) which serve to decouple different antenna signals. Thus, for example, one segment (2.11) or (2.13) can serve for radio reception and the other segment (2.13) and (2.11) for television reception.

With the antennas according to the invention 5 through 10, the at least three frame-shaped segments (2.12)(2.13)(2.14) are divided by a plurality of linear electrically insulating regions (2.3) that run transversely through the segments (2.12)(2.13)(2.14). This yields, within the segments (2.12)(2.13)(2.14), a plurality of electrically conducting regions, which are, however, separated from each other by the electrically insulating regions (2.3). The plurality of electrically conducting regions are preferably square. The edge lengths of the plurality of electrically conducting regions are, according to the invention, clearly smaller than the wavelengths of the radiation to be received or transmitted, preferably by the factor 10 to 10000. The edge length of the plurality of electrically conducting structures is preferably from 1 mm to 6 mm and especially preferably from 2 mm to 4 mm.

Figure 5:
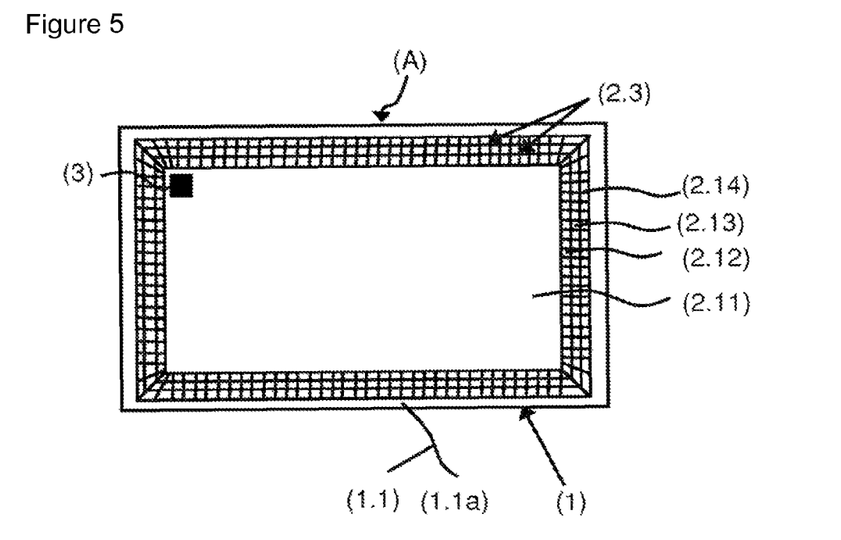
FIG. 5 depicts a fifth embodiment of the antenna according to the invention in top plan view.

In the antenna according to the invention 5, the plurality of electrically conducting regions form circumferentially closed, frame-shaped segments (2.12)(2.13)(2.14). The frame width of the sum of the frame-shaped segments (2.12)(2.13)(2.14) is 10 mm to 50 mm, preferably 20 mm to 45 mm. With the segments (2.12)(2.13)(2.14), an adequate decoupling of the segment (2.11) from the vehicle body is obtained. The arrangement is particularly propitious for obtaining high reception quality in the segment (2.11).

Figure 6:
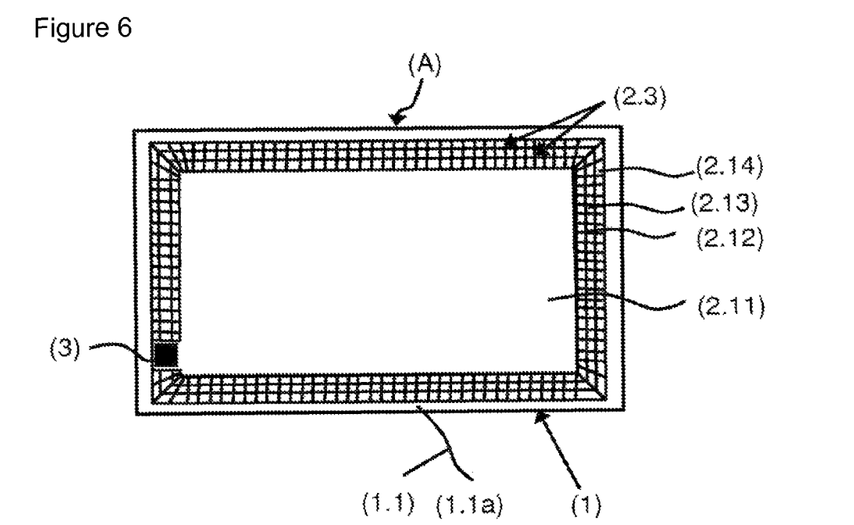
FIG. 6 depicts a sixth embodiment of the antenna according to the invention in top plan view.
Figure 7:
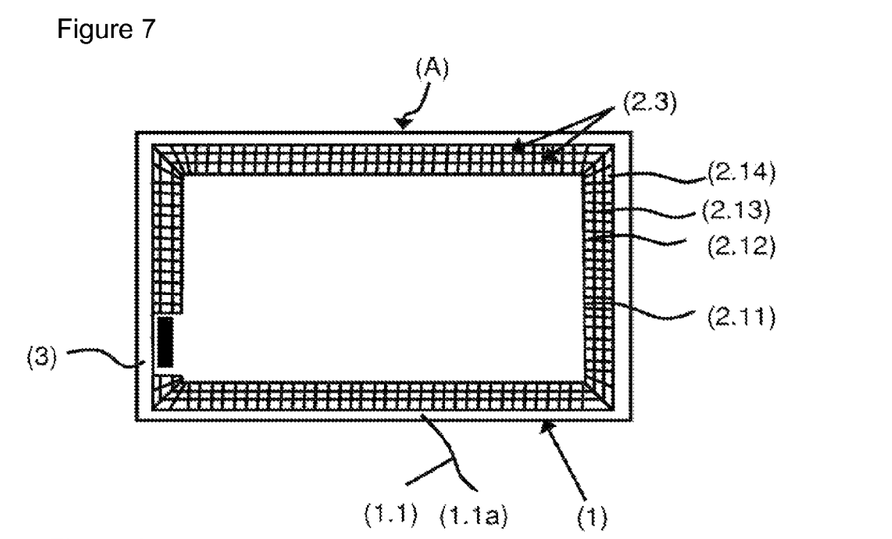
FIG. 7 depicts a seventh embodiment of the antenna according to the invention in top plan view.

The antennas according to the invention of FIGS. 6 and 7 are a continuation according to the invention of the exemplary embodiment of FIG. 5. In the at least three frame-shaped segments (2.12)(2.13)(2.14), in the region of the connection (3), the insulating regions (2.3) running transversely and in subregions also running in a frame shape are interrupted. The segment (2.11) is continued in the contact region (3) to the uncoated edge region (1.1a). The width of the interruption is, preferably, 20 mm to 100 mm, more preferably, 30 mm to 90 mm. This is particularly propitious with the galvanic decoupling of the antenna signal. With capacitive coupling, the width of the interruption is, preferably, 100 mm to 400 mm and, especially preferably, 120 mm to 180 mm. An improved capacitive decoupling of the antenna signal is obtained.

Figure 8:
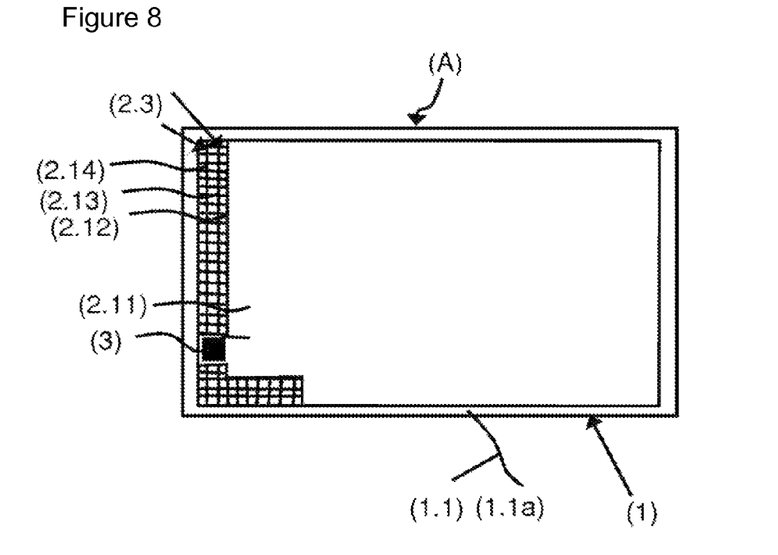
FIG. 8 depicts an eight embodiment of the antenna according to the invention in top plan view.
Figure 10:
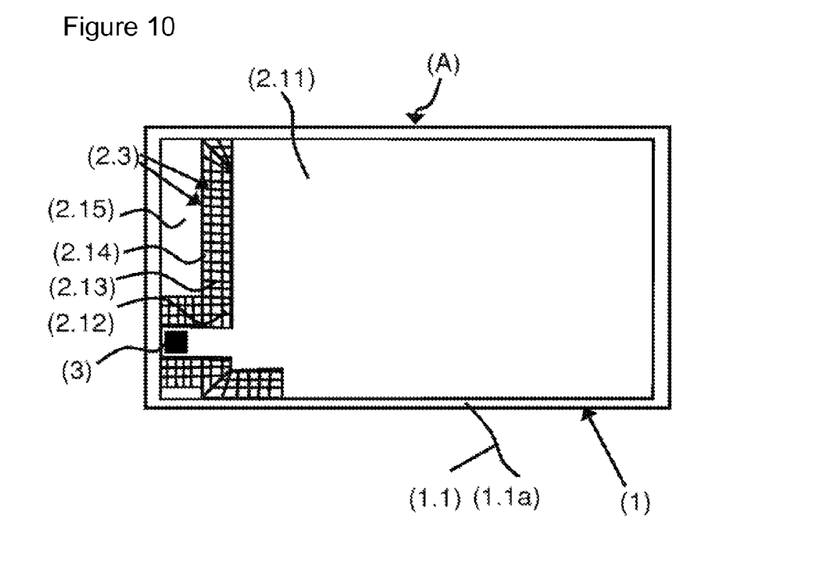
FIG. 10 depicts a tenth embodiment of the antenna according to the invention in top plan view.

The antennas according to the invention of FIGS. 8 and 10 are continuations according to the invention of the exemplary embodiment of FIG. 6. The at least three segments (2.12)(2.13)(2.14) are configured only as subframes and frame the segment (2.11) only in subregions of the substrate (1), in which a decoupling from the vehicle body is particularly important, for example, in the region of the connection (3). The length of the segments (2.12)(2.13)(2.14) is, per edge of the substrate (1), preferably, 50 mm to 2000 mm, especially preferably, 100 mm to 300 mm and, very especially preferably, 120 mm to 300 mm. With the minimized circumference of the segments (2.12)(2.13)(2.14), in particular in the region of the connection (3), an adequate decoupling of the segment (2.11) from the vehicle body is obtained according to the invention.

In FIG. 10, the at least three segments (2.12)(2.13)(2.14) are, according to the invention, separated from the edge region (1.1a) by a 10 mm to 50 mm, preferably, 20 mm to 45 mm wide segment (2.15). To ensure an adequate galvanic, capacitive, or inductive decoupling of the antenna signal, the segment (2.15) is interrupted in the region of the galvanic, capacitive, or inductive connection (3) by a region of the segments (2.12)(2.13)(2.14) widened by 10 mm to 50 mm, preferably, 20 mm to 45 mm. With a minimized circumference, according to the invention, an adequate decoupling of the segment (2.11) from the vehicle body and very good reception quality are obtained.

Figure 11:
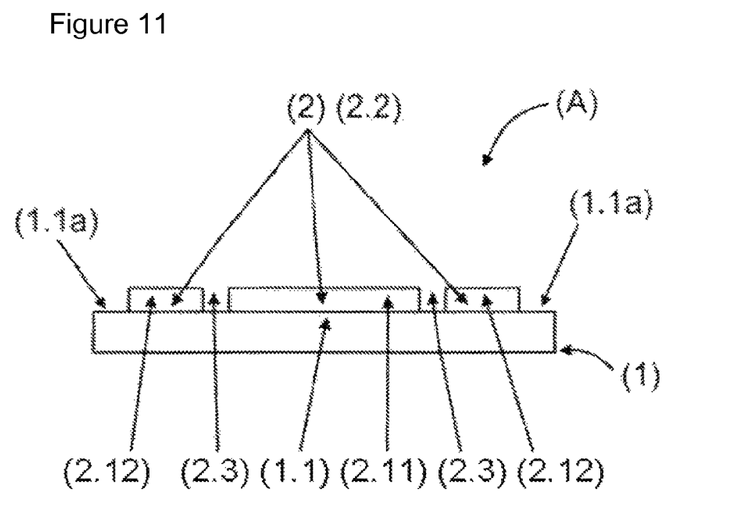
FIG. 11 depicts the cross-section through an alternative of the first embodiment according to FIG. 1 along the line X-X.

FIG. 11 depicts a cross-section through the antenna according to the invention 1 along the cross-sectional line X-X.

In a first alternative of the antenna according to the invention 1, this includes substantially only the substrate (1) and the coating (2). Generally, this alternative is used when the coating (2) is exposed to no mechanical and/or chemical loads. This is, for example, the case, when with the use according to the invention as a transparent built-in part, the free surface of the substrate (1) is turned outward facing the atmosphere, whereas in contrast the coating (2) is protected in the interior of a motor vehicle or of a building.

FIG. 11 also depicts a cross-section through the antenna according to the invention 1 along the cross-sectional line X-X.

In this second alternative of the antenna according to the invention 1, this also includes a second substrate (4) of the same kind as the substrate (1). The two substrates (1) and (4) are firmly bonded to each other via a 0.8 mm thick layer (5) based on tear-resistant PVB. The coating (2) on the substrate (1) is virtually embedded in the layer (5). This second alternative of the antenna according to the invention 1 is eminently suitable as a laminated glass pane or a laminated safety glass pane with an antenna function.

The antennas according to the invention 1 to 14 are preferably produced, by first producing a transparent, pane-shaped laminate (A'). This comprises a substrate (1) that has on its surface (1.1) a circumferential edge region (1.1a), and a nonsegmented coating (2) that covers large areas of the substrate (1) up to the edge region (1.1a).

The nonsegmented coating (2) is produced as described [in] the German translation of the European patent EP 0 847 965 B1 with the file number DE 697 31 2 168 T2, Example 1, page 9, par. [0063], to page 11, par. [0080].

To produce the edge region (1.1a), the nonsegmented coating (2) is removed by grinding to a distance of 7.5 mm from the edge of the substrate (1).

Then, the region (2.3) or the regions (2.3) is/are inscribed in the nonsegmented coating (2) by irradiation with the focused laser beam of a neodymium:YAG laser of a wavelength of 523 nm, in other words, the material (2.2) of the coating (2) is removed in the regions (2.3). This yields the segments (2.1n) and/or divided segments (2.1n), of which at least one is furnished with a capacitive connection, e.g., a connection according to the German patent application DE 103 19 606 A1.

Figure 12:
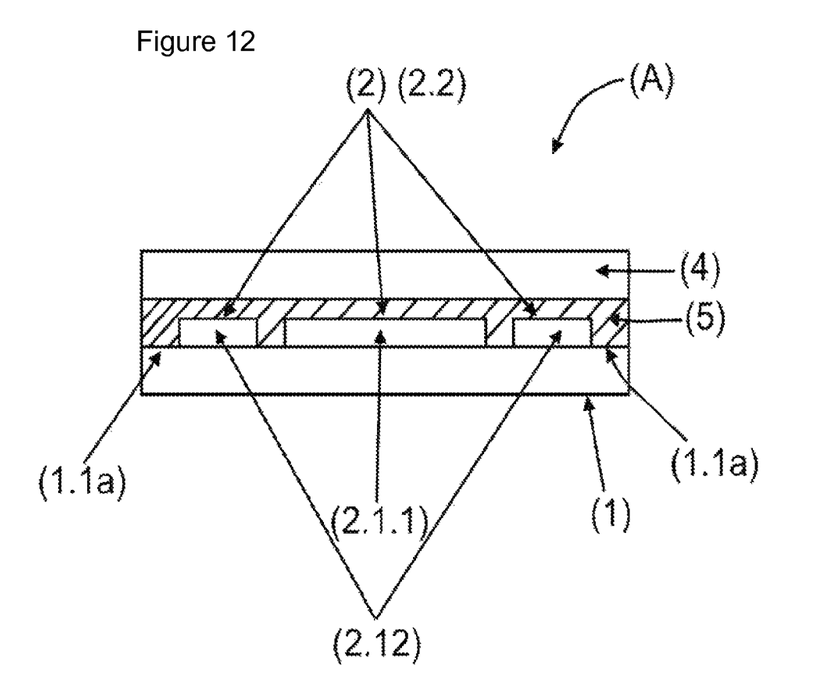
FIG. 12 depicts the cross-section through another alternative of the first embodiment according to FIG. 1 along the line X-X.
Figure 13:
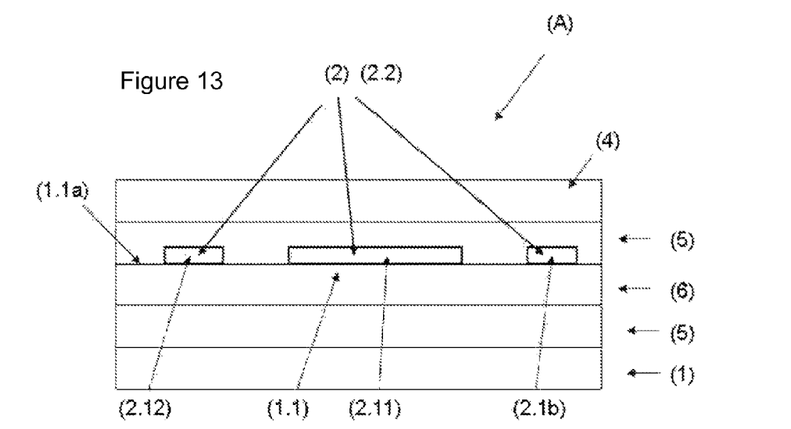
FIG. 13 depicts the cross-section through an embodiment according to FIG. 1 along the line X-X with a PET film as a carrier substrate for the conductive coating.
Figure 14:
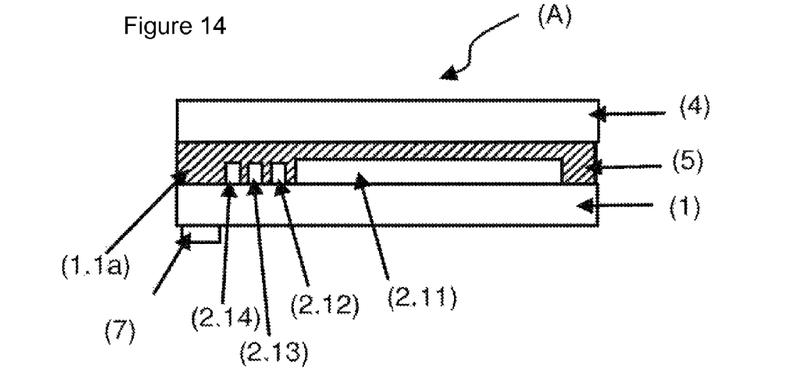
FIG. 14 depicts the cross-section through a laminate according to the invention according to FIG. 9 along the line Y-Y with a connection conductor.

FIG. 12 also depicts a cross-section through the antenna according to the invention 1 along the cross-sectional line X-X.

In this alternative of the antenna according to the invention 1, the antenna also includes a PET film (6) as a carrier substrate for the conductive coating (2). The PET layer is bonded above and below to a layer (5) of a tear-resistant PVB. The coating (2) is virtually embedded in the layer (5) and/or (6). The two substrates (1) and (4) are firmly bonded via a 0.8 mm thick layer (5) based on tear-resistant PVB to the PET layer (6). This alternative of the antenna according to the invention 1 is eminently suitable as a laminated glass pane or laminated safety glass pane with an antenna function.

Figure 9:
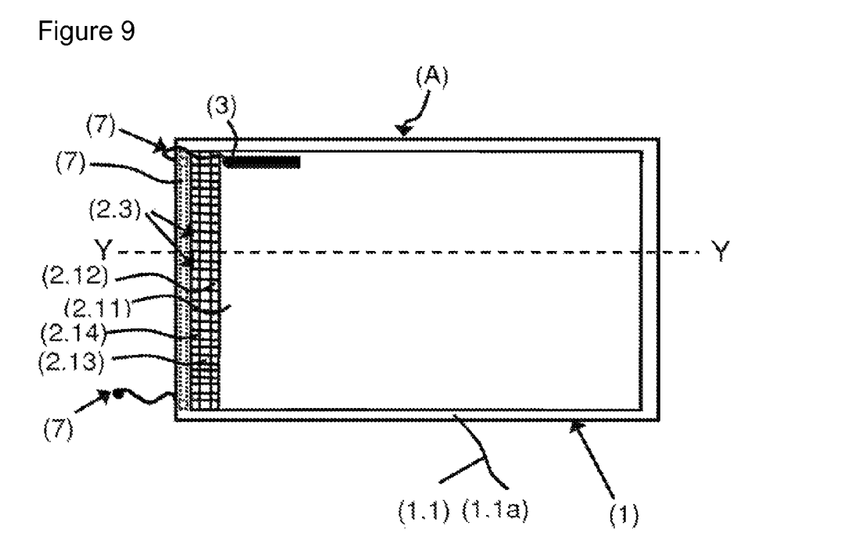
FIG. 9 depicts a ninth embodiment of the antenna according to the invention in top plan view.

FIG. 9 depicts an exemplary embodiment in a further continuation according to FIG. 8 as a laminate with a return connection conductor (7). The at least three strip-shaped and divided segments (2.12)(2.13)(2.14) are arranged only in the region of a side edge in the region of the connection (3). The decoupling of the segment (2.11) to a side edge is especially important, since a connection conductor (7) also runs in the edge region (1.1a), which conductor connects the connection (3) on the top edge of the substrate (1) to the onboard electronics (not shown) of the motor vehicle body on the bottom edge of the substrate (1). The laminate includes the substrate (1), a tear-resistant film (5), and another substrate (4). The coating (2) was applied on the side of the substrate (1) inside the laminate. The screenprint (7) of the flat conductor is located on the external side of the substrate (1) in the interior of the motor vehicle body, on the internal side of the substrate (1), or on an additional PET carrier film (6).

For the embodiments according to the invention, a particularly propitious decoupling and good reception performance of the segment (2.11) as a motor vehicle antenna has been shown. The connection conductor (7) comprises, as depicted in FIG. 9 and in cross-section in FIG. 14, a screen print and/or a flat cable (7). The connection conductor (7) is connected to the connection (3) and to the onboard electrical system (not shown). The width of the screen print is 0.3 mm to 3 mm and runs inside the edge region (1.1a) or in the projection of the edge region (1.1a). The screen print and/or flat conductor produce a very good galvanic, capacitive, or inductive contact between the connection (3) on the top edge of the substrate (1) and the onboard electronics in the region of the bottom edge of the substrate (1) to the motor vehicle body.

The invention claimed is:

1. A transparent, flat antenna for transmitting and receiving electromagnetic waves, comprising
    a) at least one first transparent electrically insulating substrate, wherein a surface of the at least one first transparent electrically insulating substrate comprises an electrically insulating circumferential edge region;
    b) a transparent electrically conductive coating, wherein:
        b1) the transparent electrically conductive coating covers large areas of the surface of the at least one first transparent electrically insulating substrate up to the electrically insulating circumferential edge region, and
        b2) the transparent electrically conductive coating is formed by at least two flat segments, wherein:
            i) the at least two flat segments contain at least one electrically conductive material,
            ii) the at least two flat segments are insulated from each other by at least one linear electrically insulating region, and
            iii) at least one flat segment in the at least two flat segments is subdivided by linear electrically insulating regions;
    c) at least one connection for decoupling of the received electromagnetic waves from the at least one flat segment; and
    d) at least one second transparent electrically insulating substrate and at least one transparent tear-resistant adhesive layer located between the at least one first transparent electrically insulating substrate and the at least one second transparent electrically insulating substrate.

2. The transparent, flat antenna according to claim 1, wherein the transparent electrically conductive coating is located on the surface of the at least one first transparent electrically insulating substrate facing the at least one transparent tear-resistance adhesive layer.

3. The transparent, flat antenna according to claim 1, wherein the transparent electrically conductive coating is located on an electrically insulating carrier film.

4. The transparent, flat antenna according to claim 3, wherein the electrically insulating carrier film is a polyethylene terephthalate film.

5. The transparent, flat antenna according to claim 1, wherein the electrically insulating circumferential edge region has a width of 0.2 cm to 1.5 cm.

6. The transparent, flat antenna according to claim 1, wherein the linear electrically insulating region has a width of 10 μm to 200 μm.

7. The transparent, flat antenna according to claim 1, wherein the linear electrically insulating region is circumferentially closed and surrounds the at least one flat segment such that two ends of the linear electrically insulating region are guided to the electrically insulating circumferential edge region.

8. The transparent, flat antenna according to claim 1, wherein the linear electrically insulating region runs substantially parallel to the electrically insulating circumferential edge region.

9. The transparent, flat antenna according to claim 1, wherein one of the at least two flat segments is partially or completely surrounded by the other flat segment.

10. The transparent, flat antenna according to claim 1, further comprising a connection conductor that runs at least partially into the electrically insulating circumferential edge region.

11. The transparent, flat antenna according to claim 10, wherein the connection conductor is any one of a galvanic, capacitive, or inductive connection conductor.

12. The transparent, flat antenna according to claim 1, wherein the decoupling by the at least one connection is any one of galvanic, capacitive, or inductive decoupling.

13. The transparent, flat antenna according to claim 1, wherein the linear electrically insulating region is circumferentially open and surrounds the at least one flat segment such that two ends of the linear electrically insulating region are guided to the electrically insulating circumferential edge region.

14. A transparent, flat antenna for transmitting and receiving electromagnetic waves, comprising
- a) at least one first transparent electrically insulating substrate, wherein a surface of the at least one first transparent electrically insulating substrate comprises an electrically insulating circumferential edge region;
- b) a transparent electrically conductive coating, wherein:
  - b1) the transparent electrically conductive coating covers large areas of the surface of the at least one first transparent electrically insulating substrate up to the electrically insulating circumferential edge region, and
  - b2) the transparent electrically conductive coating is formed by at least two flat segments, wherein:
    - i) the at least two flat segments contain at least one electrically conductive material,
    - ii) the at least two flat segments are insulated from each other by at least one linear electrically insulating region, and
    - iii) at least one flat segment in the at least two flat segments is subdivided by linear electrically insulating regions; and
- c) at least one connection for decoupling of the received electromagnetic waves from the at least one flat segment, wherein one of the at least two flat segments is partially or completely surrounded by the other flat segment, wherein the other flat segment is configured in strip-form.

15. The transparent, flat antenna according to claim 14, wherein the strip-form, flat segment is divided by at least one further linear electrically insulating region into at least two strip-form flat segments.

16. A method comprising:
providing a transparent, flat antenna for transmitting and receiving electromagnetic waves, comprising
- a) at least one first transparent electrically insulating substrate, wherein a surface of the at least one first transparent electrically insulating substrate comprises an electrically insulating circumferential edge region,
- b) a transparent electrically conductive coating, wherein:
  - b1) the transparent electrically conductive coating covers large areas of the surface of the at least one first transparent electrically insulating substrate up to the electrically insulating circumferential edge region, and
  - b2) the transparent electrically conductive coating is formed by at least two flat segments, wherein:
    - i) the at least two flat segments contain at least one electrically conductive material,
    - ii) the at least two flat segments are insulated from each other by at least one linear electrically insulating region, and
    - iii) at least one flat segment in the at least two flat segments is subdivided by linear electrically insulating regions;
- c) at least one connection for decoupling of the received electromagnetic waves from the at least one flat segment, and
- d) at least one second transparent electrically insulating substrate and at least one transparent tear-resistant adhesive layer located between the at least one first transparent electrically insulating substrate and the at least one second transparent electrically insulating substrate; and
using said antenna as a transparent built-in part in trains, aircraft, ships, furniture, equipment, buildings, as well as in motor vehicles in the form of windshields, side windows, rear windows, glass roofs, and/or as a free-standing, transparent, decorative separate part.

* * * * *

UNITED STATES PATENT AND TRADEMARK OFFICE
CERTIFICATE OF CORRECTION

PATENT NO. : 8,872,703 B2  Page 1 of 1
APPLICATION NO. : 13/127880
DATED : October 28, 2014
INVENTOR(S) : Christoph Degen et al.

It is certified that error appears in the above-identified patent and that said Letters Patent is hereby corrected as shown below:

In the Specification

• In the body of the text, column 9, line 48, please delete "invention and be produced" and replace with "invention can be produced".

• In the body of the text, column 13, line 3, please delete "invention der FIGS. 1 to 14" and replace with "invention of FIGS. 1 to 14".

Signed and Sealed this
Third Day of February, 2015

Michelle K. Lee
*Deputy Director of the United States Patent and Trademark Office*